(12) United States Patent
Lee et al.

(10) Patent No.: US 11,892,137 B2
(45) Date of Patent: Feb. 6, 2024

(54) VEHICLE LAMP

(71) Applicant: SL Corporation, Daegu (KR)

(72) Inventors: Hee Min Lee, Gyeongsan-si (KR); Hyo Jin Han, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/194,585

(22) Filed: Mar. 31, 2023

(65) Prior Publication Data

US 2023/0383920 A1 Nov. 30, 2023

(30) Foreign Application Priority Data

May 31, 2022 (KR) .................. 10-2022-0066969

(51) Int. Cl.
*F21S 41/255* (2018.01)
*B60Q 1/06* (2006.01)
*F21S 41/43* (2018.01)
*F21S 43/15* (2018.01)
*F21S 43/40* (2018.01)
*F21S 41/33* (2018.01)
*F21S 41/151* (2018.01)
*F21Y 115/10* (2016.01)

(52) U.S. Cl.
CPC .............. *F21S 41/255* (2018.01); *B60Q 1/06* (2013.01); *F21S 41/333* (2018.01); *F21S 41/43* (2018.01); *F21S 43/15* (2018.01); *F21S 43/40* (2018.01); *F21S 41/151* (2018.01); *F21Y 2115/10* (2016.08)

(58) Field of Classification Search
CPC ....... F21S 41/333; F21S 41/255; F21S 41/151
See application file for complete search history.

(56) References Cited

U.S. PATENT DOCUMENTS

| 2016/0368412 A1* | 12/2016 | Shibata | F21S 45/48 |
| 2022/0205603 A1* | 6/2022 | Go | F21S 41/285 |
| 2023/0213161 A1* | 7/2023 | Li | F21S 41/255 |
| | | | 362/511 |

FOREIGN PATENT DOCUMENTS

WO   WO-2022001239 A1 *  1/2022

* cited by examiner

*Primary Examiner* — Karabi Guharay
(74) *Attorney, Agent, or Firm* — United One Law Group LLC; Kongsik Kim; Jhongwoo Peck

(57) ABSTRACT

A vehicle lamp includes a first optical unit that irradiates light for forming a first beam pattern; a second optical unit that irradiates light for forming a second beam pattern and is disposed on one side of the first optical unit in a left-right direction; and a lens unit disposed in front of the first optical unit and the second optical unit to allow the light irradiated from at least one of the first optical unit or the second optical unit to pass through the lens unit to form at least one of the first beam pattern or the second beam pattern. The lens unit includes a first lens module corresponding to the first optical unit and a second lens module corresponding to the second optical unit, and the first lens module and the second lens module are integrally formed with one another.

20 Claims, 16 Drawing Sheets

VEHICLE LAMP

CROSS-REFERENCE TO RELATED APPLICATION

This application claims priority from Korean Patent Application No. 10-2022-0066969, filed on May 31, 2022, which is incorporated herein by reference in its entirety.

BACKGROUND

1. Technical Field

The present disclosure relates to a vehicle lamp, and more particularly, to a vehicle lamp capable of realizing a slim and integrated appearance while two or more lamps are used.

2. Description of the Related Art

A vehicle includes various types of vehicle lamps for an illumination function and a signaling function. The illumination function enables the driver of the vehicle to easily detect objects around the vehicle while operating in low-light conditions (e.g., night-time driving), and the signaling function is used to inform nearby vehicles or pedestrians of the vehicle's driving state.

For example, a headlamp and a fog lamp are designed primarily for the illumination function, and a daytime running lamp, a position lamp, a turn signal lamp, a tail lamp and a brake lamp are designed primarily for the signaling function. The installation standards and specifications of these vehicle lamps are prescribed by law so that each lamp can fully satisfy its functional requirements.

Recently, the aesthetic aspect that consumers feel, through design improvement, as well as the functional aspect of helping safe driving by securing the driver's visibility, which is the basic role of vehicle lamps, greatly affect the purchase decision for a vehicle.

Therefore, it is required to come up with ways to improve the exterior design of a vehicle lamp by making the vehicle lamp have a slimmer form factor and to realize an integrated appearance by eliminating a sense of separation between lamps even when two or more lamps are used as the vehicle lamp.

SUMMARY

Aspects of the present disclosure provide a vehicle lamp in which respective lens units of two or more lamps are integrally formed to realize an integrated appearance without a sense of separation between the lamps.

Aspects of the present disclosure also provide a vehicle lamp which can form an optimal beam pattern while realizing a slim form factor using a plurality of lamp modules arranged in a left-right direction.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a vehicle lamp may include a first optical unit that irradiates light for forming a first beam pattern; a second optical unit that irradiates light for forming a second beam pattern and is disposed on one side of the first optical unit in a left-right direction; and a lens unit disposed in front of the first optical unit and the second optical unit to allow the light irradiated from at least one of the first optical unit or the second optical unit to pass through the lens unit to form at least one of the first beam pattern or the second beam pattern. In particular, the lens unit may include a first lens module corresponding to the first optical unit and a second lens module corresponding to the second optical unit, and the first lens module and the second lens module may be integrally formed with one another.

The first optical unit and the second optical unit may be spaced apart from each other by a predetermined distance. The second optical unit may be disposed at laterally outer side from the first optical unit in a vehicle in the left-right direction.

The first optical unit may include a plurality of first lamp modules arranged in the left-right direction, and the second optical unit may include a plurality of second lamp modules arranged in the left-right direction. The first lens module may include a plurality of first optical modules corresponding to the plurality of first lamp modules. The second lens module may include a plurality of second optical modules corresponding to the plurality of second lamp modules.

Each of the plurality of first optical modules may include a first incident portion to which light is incident and a first exit portion from which the light incident to the first incident portion is output, and each of the plurality of second optical modules may include a second incident portion to which light is incident and a second exit portion from which the light incident to the second incident portion is output. The first incident portion and the second incident portion may have different shapes, and/or the first exit portion and the second exit portion may have different shapes.

The first incident portion of each of the plurality of first optical modules may be convex rearward, and the second incident portions of the plurality of second optical modules may form a continuous surface.

Each of the first exit portion and the second exit portion may include a plurality of exit modules arranged in the left-right direction, and the plurality of exit modules may be arranged in a stepped configuration such that the plurality of exit modules are disposed at more forward or rearward positions going from one side toward the other side in the left-right direction. Each of the plurality of exit modules may include a plurality of exit surfaces arranged in an up-down direction, and the plurality of exit surfaces may be arranged in a stepped configuration such that the plurality of exit surfaces are disposed at more forward positions going from top to bottom.

Each of the first lamp modules may include a first light source, a first reflector that reflects the light generated from the first light source forward, and a shield that obstructs at least a portion of the light that proceeds toward the lens unit after being reflected by the first reflector. A front end of the shield may exhibit a curved shape that extends rearward from a middle portion thereof toward both sides thereof.

Each of the second lamp modules may include a second light source and a second reflector that reflects the light generated from the second light source forward.

The vehicle lamp may further include an aiming unit that adjusts a direction in which the light is irradiated from the first optical unit by rotating the first optical unit in at least one of the up-down direction or the left-right direction.

The vehicle lamp may further include a third optical unit disposed on the other side of the first optical unit in the left-right direction, such that one of the second optical unit or the third optical unit is disposed at laterally outer side of the first optical unit in the vehicle, and the other thereof is disposed laterally inner side of the first optical unit in the vehicle. The lens unit may further include a third lens module corresponding to the third optical unit, and the third lens module may be integrally formed with the first lens module and the second lens module.

A vehicle lamp according to the present disclosure provides at least one of the following advantages. Since the lens units used in two or more lamps are integrally formed, an integrated appearance may be realized without a sense of separation between the two or more lamps. In addition, since a plurality of lamp modules are arranged in the left-right direction, an optimal beam pattern may be formed while realizing a slim form factor. However, the effects of the present disclosure are not restricted to those set forth herein. The above and other effects of the present disclosure will become more apparent to one of ordinary skill in the art to which the present disclosure pertains by referencing the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
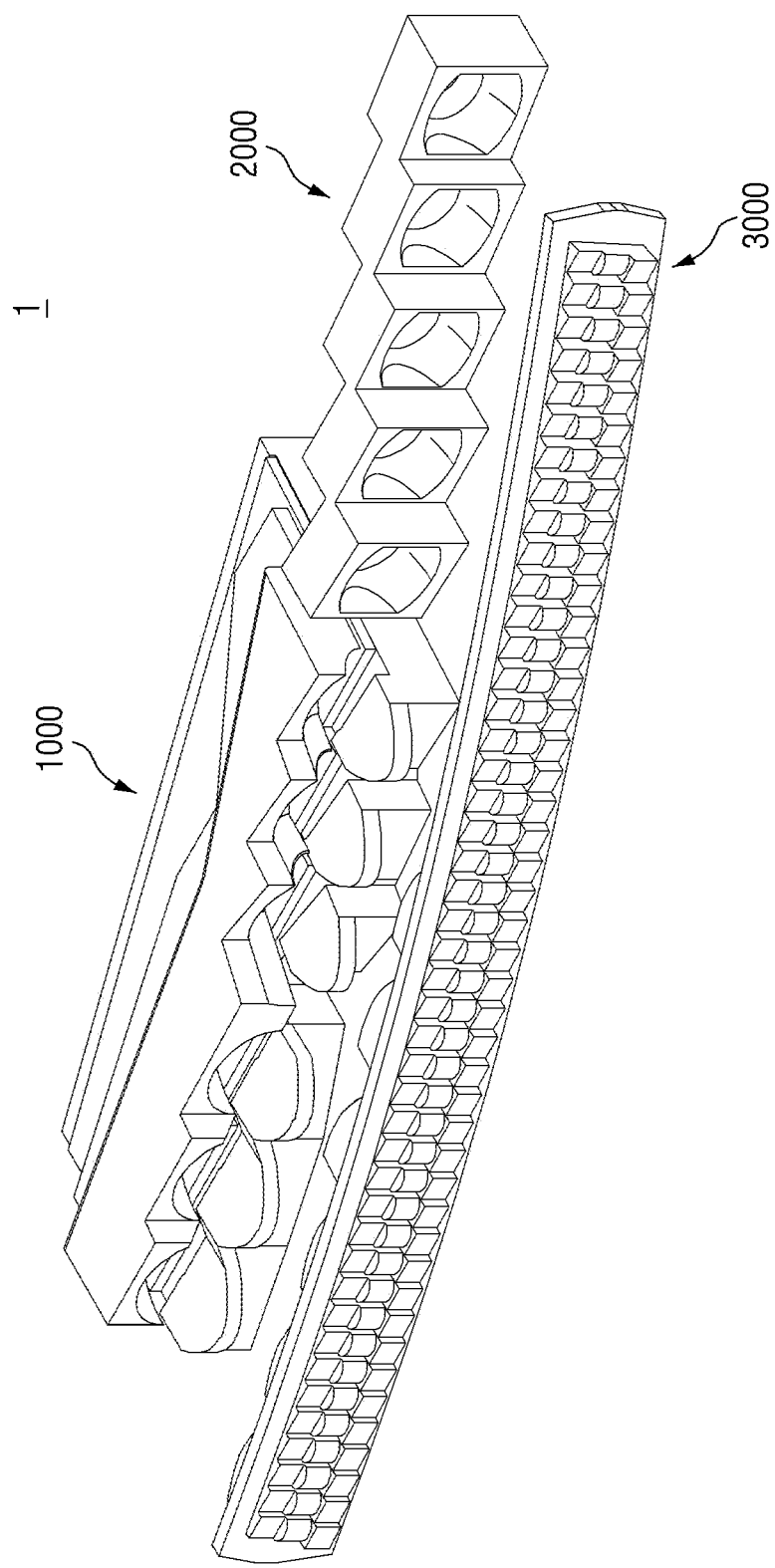
FIGS. 1 and 2 are perspective views of a vehicle lamp according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but should be construed to include deviations in shapes that result, for example, from manufacturing. In the drawings, respective components may be enlarged or reduced in size for convenience of explanation.

Hereinafter, the preset disclosure will be described with reference to the drawings for describing vehicle lamps according to embodiments of the present disclosure.

Figure 2:
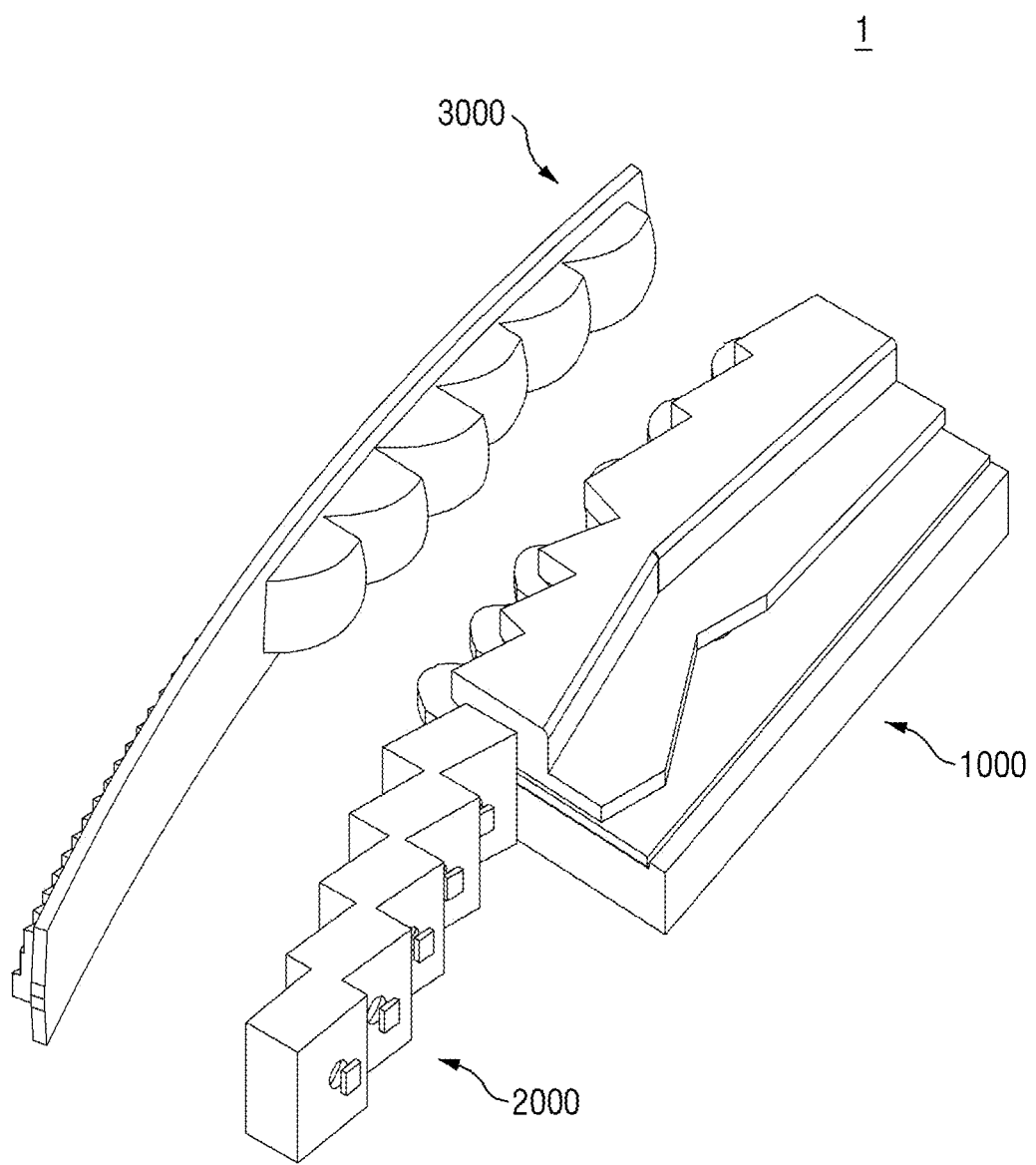
Figure 3:
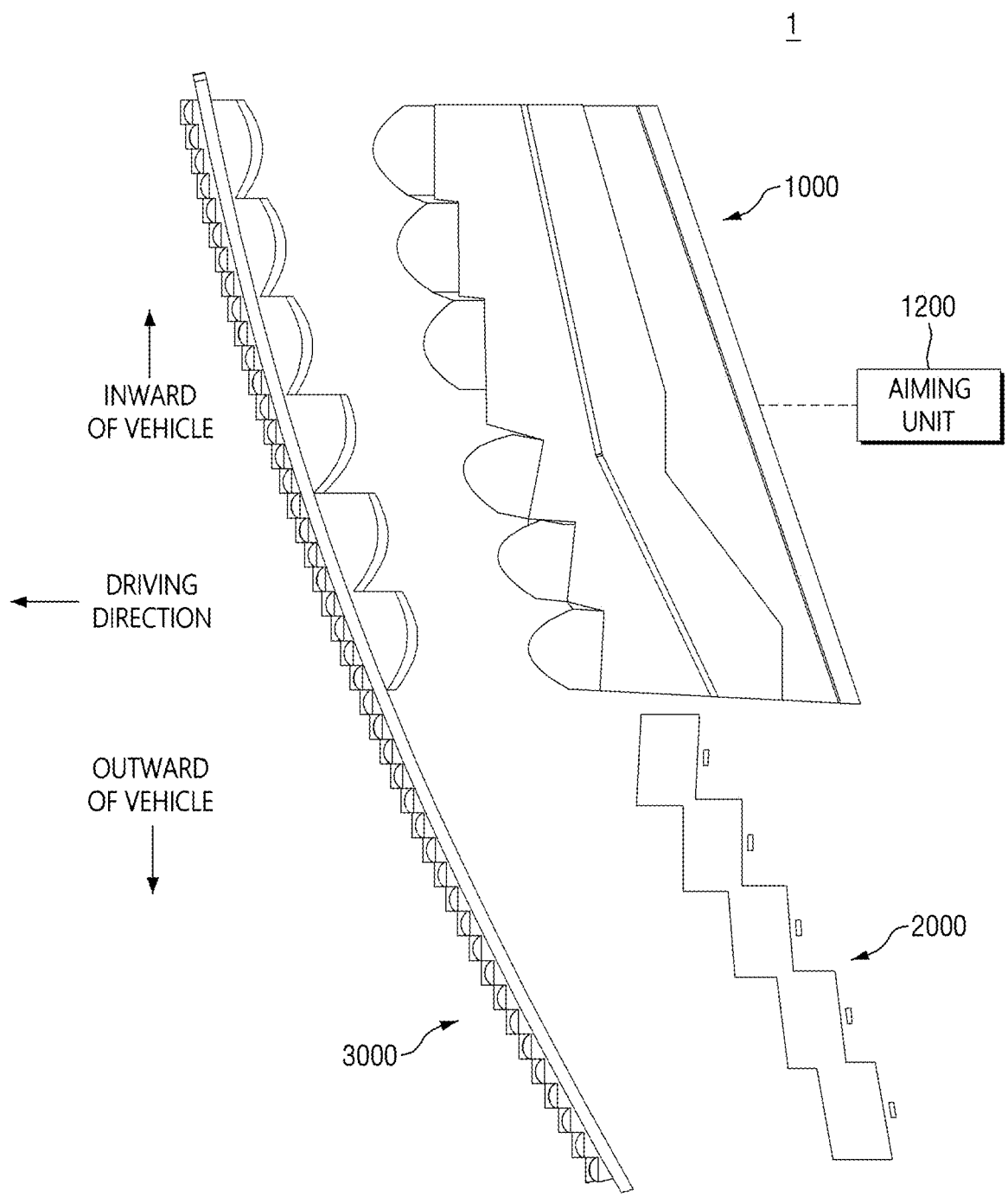
FIG. 3 is a plan view of the vehicle lamp according to the embodiment of the present disclosure.

FIGS. 1 and 2 are perspective views of a vehicle lamp 1 according to an embodiment of the present disclosure. FIG. 3 is a plan view of the vehicle lamp 1 according to the embodiment of the present disclosure.

Referring to FIGS. 1 through 3, the vehicle lamp 1 according to the embodiment of the present disclosure may include a first optical unit 1000, a second optical unit 2000, and a lens unit 3000.

In the embodiment of the present disclosure, the vehicle lamp 1 may be used for an illumination function to secure a driver's forward view, such as a head lamp, and the like and/or as a signaling function to inform drivers of nearby vehicles or pedestrians of the driving state of the vehicle, such as a turn signal lamp, a daytime running lamp, a position lamp, and the like. The vehicle lamp 1 of the present disclosure may be used for either the illumination function or the signaling function or may be used for both the illumination function and the signaling function. Even if the vehicle lamp 1 of the present disclosure is used for one of the illumination function or the signaling function, it may be used as two or more different lamps having different purposes provided for the function.

In the embodiment of the present disclosure, an example where the vehicle lamp 1 is used for both the illumination function and the signaling function, specifically, used as a head lamp for the illumination function and as a turn signal lamp for the signaling function will be described.

In addition, in the embodiment of the present disclosure, when the vehicle lamp 1 is used as a headlamp, an example where the vehicle lamp 1 forms a low beam pattern in which light is irradiated below a predetermined cutoff line to avoid dazzling drivers of vehicles ahead such as preceding vehicles or oncoming vehicles will be described.

The first optical unit 1000 may irradiate light for forming a first beam pattern. In the embodiment of the present disclosure, an example where the first beam pattern is a low beam pattern will be described.

Figure 4:
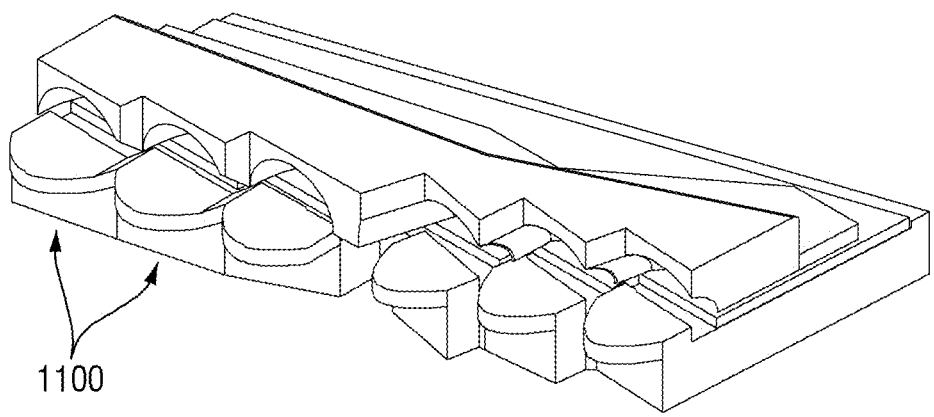
FIG. 4 is a perspective view of a first optical unit according to an embodiment of the present disclosure.
Figure 5:
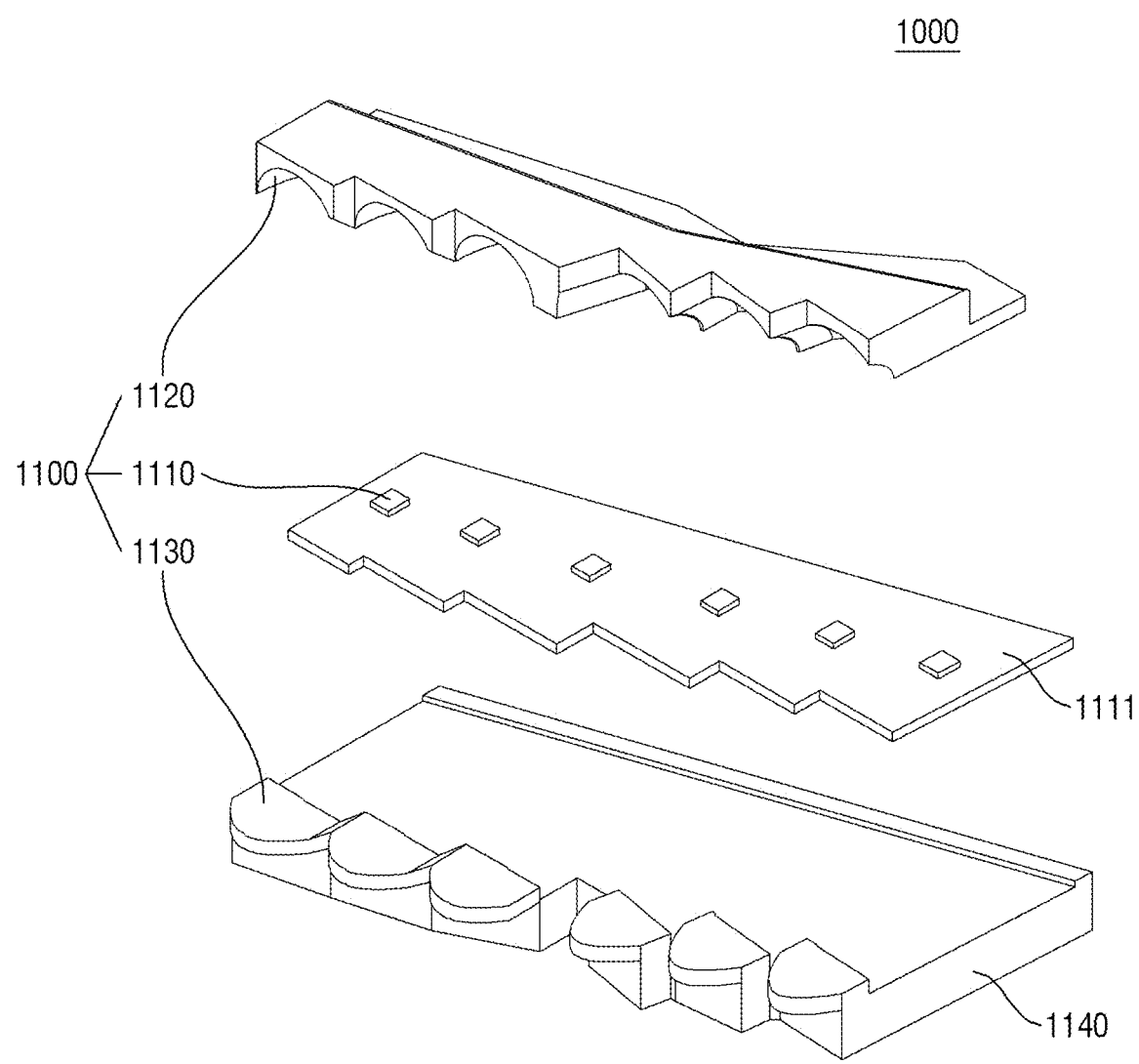
FIGS. 5 and 6 are exploded perspective views of the first optical unit according to the embodiment of the present disclosure.
Figure 6:
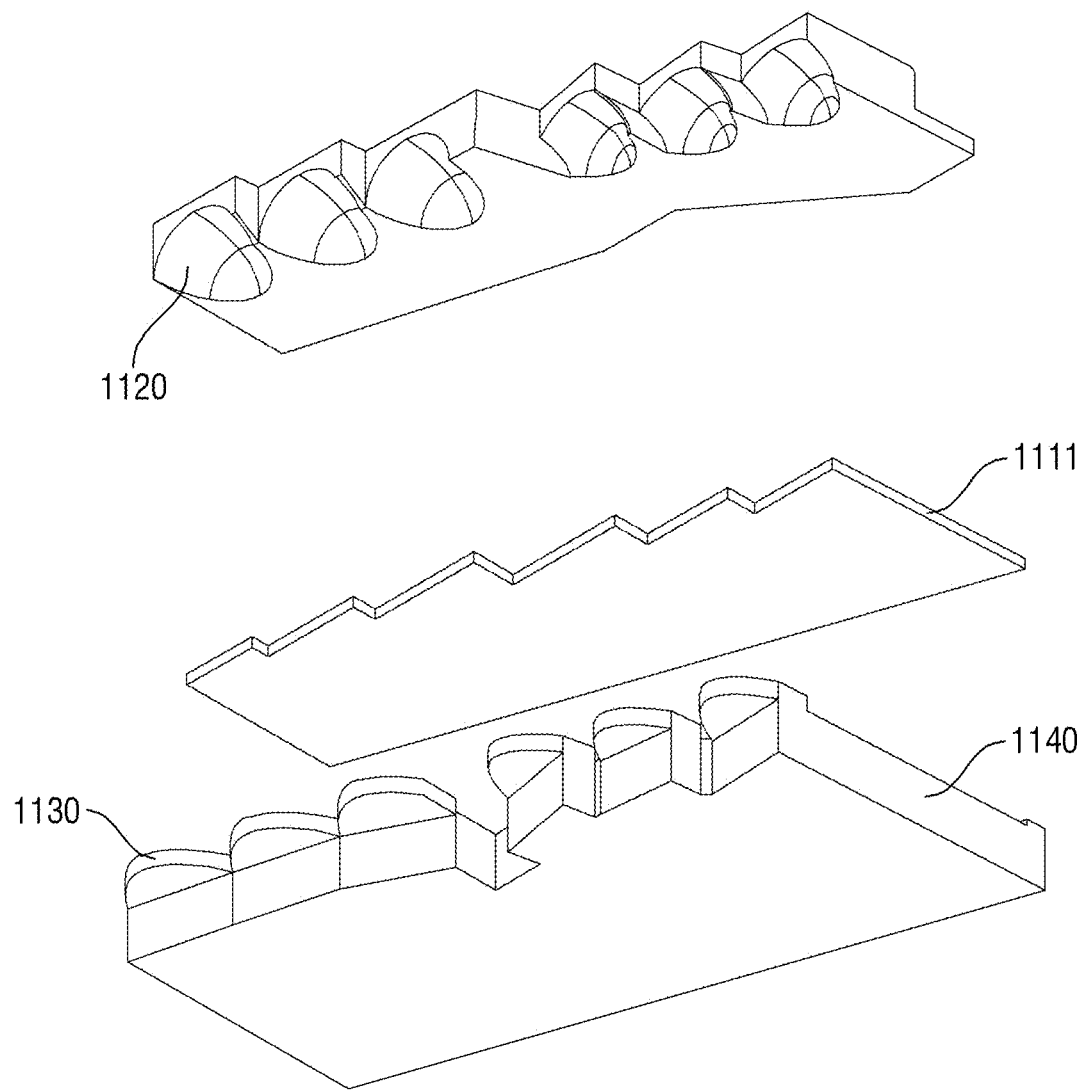
Figure 7:
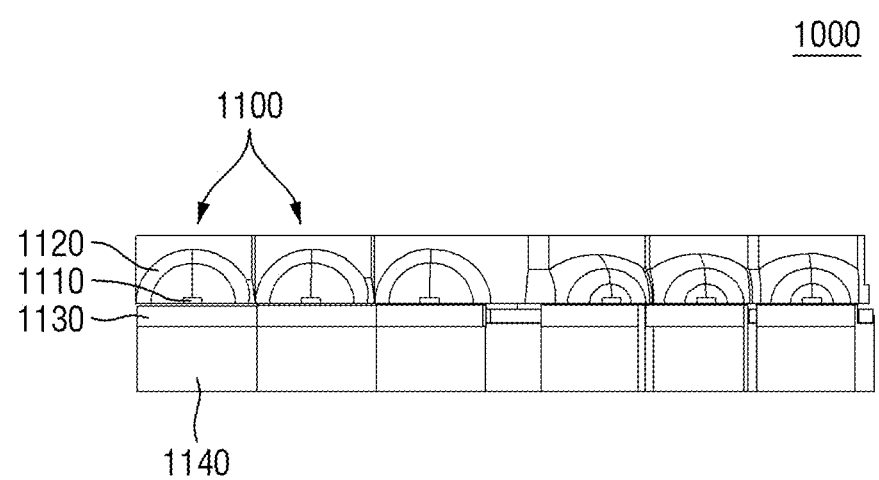
FIG. 7 is a front view of the first optical unit according to the embodiment of the present disclosure.

FIG. 4 is a perspective view of a first optical unit 1000 according to an embodiment of the present disclosure. FIGS. 5 and 6 are exploded perspective views of the first optical unit 1000 according to the embodiment of the present disclosure. FIG. 7 is a front view of the first optical unit 1000 according to the embodiment of the present disclosure.

Referring to FIGS. 4 through 7, the first optical unit 1000 according to the embodiment of the present disclosure may include at least one first lamp module 1100. In the embodiment of the present disclosure, an example where the first optical unit 1000 includes a plurality of first lamp modules 1100 arranged in a left-right direction to realize a slim design will be described. In this case, light distribution patterns that are respectively formed by the first lamp modules 1100 may overlap with one another to collectively form the first beam pattern.

In the embodiment of the present disclosure, the first lamp modules 1100 may be disposed at more forward or rearward positions going from one side toward the other side in the left-right direction so that they are arranged in conformity with the body contour of the vehicle.

In other words, the vehicle lamp 1 of the present disclosure may be accommodated in an inner space formed by a lamp housing and a cover lens coupled to the lamp housing. Since an outer surface of the cover lens forms part of the body contour of the vehicle, it can be understood that the first lamp modules 1100 may be disposed along the shape of the outer surface of the cover lens. The position of each of the first lamp modules 1100 may vary depending on the shape of the outer surface of the cover lens. In the embodiment of the present disclosure, one of the first lamp modules 1100 will be described as an example. However, the description may be similarly applied to other first lamp modules 1100, with only some differences in the position.

The first lamp module 1100 may include a first light source 1110, a first reflector 1120, and a shield 1130.

The first light source 1110 may generate light in an amount and/or color suitable for the vehicle lamp 1 of the present disclosure to form the first beam pattern. In the embodiment of the present disclosure, an example where a semiconductor light emitting element such as a light emitting diode (LED) is used as the first light source 1110 will be described. However, the present disclosure is not limited thereto, and not only an LED but also various types of light sources such as a laser diode (LD) or a bulb may also be used as the first light source 1110. In addition, an optical element such as a mirror, a prism, or a phosphor may be additionally used depending on the type of light source.

The first light source 1110 may be installed on a substrate 1111, which is mounted on a base 1140 such as a heat sink. This configuration may facilitate dissipation of heat since light emitting performance rapidly deteriorates if the temperature rises due to the heat generated as the first light source 1110 generates the light.

The first reflector 1120 may reflect the light generated from the first light source 1110 toward the lens unit 3000 disposed in front of the first optical unit 1000. In the embodiment of the present disclosure, an example where the first reflector 1120 has an elliptical curved surface or free curved surface that is open from a lower side toward the front so that the light generated upward from the first light source 1110 is reflected forward will be described. However, the present disclosure is not limited thereto, and the position or shape of the first reflector 1120 may vary based on the direction in which the light is generated from the first light source 1110.

In addition, in the embodiment of the present disclosure, an example where the light generated from the first light source 1110 is reflected forward by the first reflector 1120 will be described. However, the present disclosure is not limited thereto, and in some embodiments, the light generated from the first light source 1110 may also be directly incident on the lens unit 3000. In such embodiments, the first reflector 1120 may be omitted.

The shield 1130 may block or obstruct at least a portion of the light proceeding toward the lens unit 3000 after being reflected forward by the first reflector 1120. This configuration may allow the first optical unit 1000 to form a low beam pattern as the first beam pattern, in which the light is irradiated below a cutoff line.

A front end of the shield 1130 may be formed convex toward the lens unit 3000 so that it extends rearward from the middle toward both sides. This configuration is due to a configuration where a surface of the lens unit 3000 on which the light is incident is convex rearward. It will be described in more detail later.

In the embodiment of the present disclosure, an example where the shield 1130 is integrally formed at a front end of the base 1140 will be described. However, the present disclosure is not limited thereto, and the shield 1130 may also be manufactured separately from the base 1140 and then coupled and fixed to the base 1140.

The first optical unit 1000 described above may further include an aiming unit 1200 that rotates the first optical unit 1000 in at least one of an up-down direction or the left-right direction based on at least one reference point. The aiming unit 1200 may adjust the position where the first beam pattern is formed by adjusting the direction in which the light is irradiated from the first optical unit 1000. If the cutoff line is formed at an incorrect position, the low beam pattern may dazzle drivers of vehicles ahead or may fail to sufficiently secure the driver's forward view. Therefore, the first optical unit 1000 may be rotated in at least one of the up-down direction or the left-right direction via the aiming unit 1200 so that the cut-off line is formed in position.

For example, the aiming unit 1200 may include at least one aiming screw that allows the first optical unit 1000 to be mounted on a bracket while being capable of being adjusted. In this case, aiming may be performed by rotating the first optical unit 1000 connected to the aiming screw about a reference point in at least one of the up-down direction or the left-right direction based on the rotation direction of the aiming screw.

The second optical unit 2000 may irradiate light for forming a second beam pattern. In the embodiment of the present disclosure, an example where the second beam pattern is a beam pattern suitable for at least one of a turn signal lamp, a position lamp, or a daytime running lamp will be described. The second optical unit 2000 may be spaced apart from either side of the first optical unit 1000 by a predetermined distance in the left-right direction. In the embodiment of the present disclosure, an example where the second optical unit 2000 is disposed at laterally outer side of the first optical unit 1000 in the vehicle will be described. However, the present disclosure is not limited thereto, and the second optical unit 2000 may also be disposed at laterally inner side the first optical unit 1000 in the vehicle.

Figure 8:
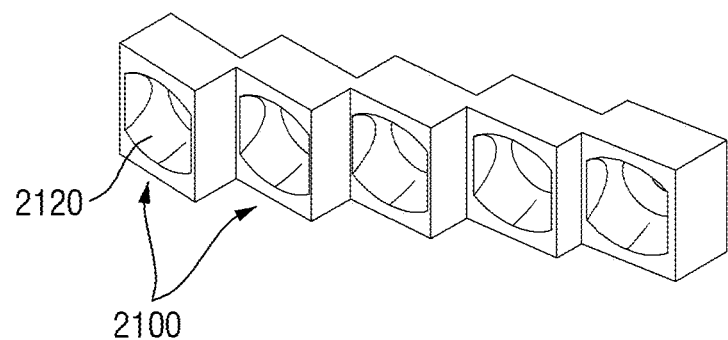
FIGS. 8 and 9 are perspective views of a second optical unit according to an embodiment of the present disclosure.
Figure 9:
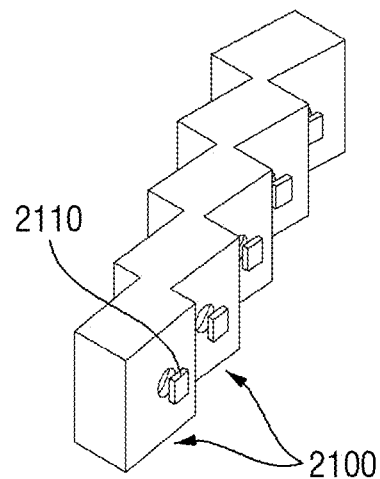
Figure 10:
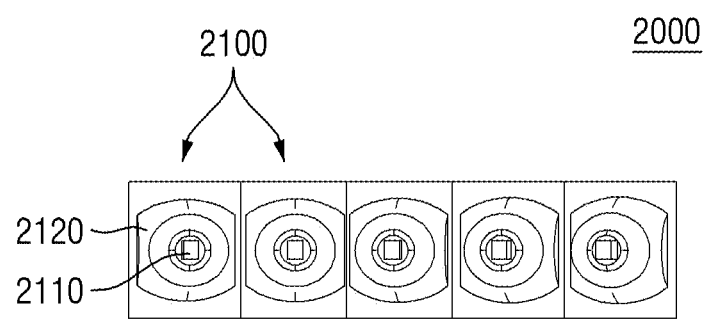
FIG. 10 is a front view of the second optical unit according to the embodiment of the present disclosure.

FIGS. 8 and 9 are perspective views of a second optical unit 2000 according to an embodiment of the present disclosure. FIG. 10 is a front view of the second optical unit 2000 according to the embodiment of the present disclosure.

Referring to FIGS. 8 through 10, the second optical unit 2000 according to the embodiment of the present disclosure may include at least one second lamp module 2100. In the embodiment of the present disclosure, an example where the second optical unit 2000 includes a plurality of second lamp modules 2100 arranged in the left-right direction to realize a slim design will be described. In this case, light distribution patterns that are respectively formed by the second lamp modules 2100 may overlap with one another to collectively form the second beam pattern.

In the embodiment of the present disclosure, the second lamp modules 2100 may be disposed at more forward or rearward positions going from one side toward the other side in the left-right direction so that they are arranged along the body line of the vehicle, like the first lamp modules 1100 described above.

In the embodiment of the present disclosure, one of the second lamp modules 2100 will be described as an example. However, the description may be similarly applied to other second lamp modules 2100 with only some differences in the position.

A second lamp module 2100 may include a second light source 2110 and a second reflector 2120.

The second light source 2110 may generate light in an amount and/or color suitable for the vehicle lamp 1 of the present disclosure to form the second beam pattern. In the embodiment of the present disclosure, an example where an LED is used as the second light source 2110, like the first light source 1110 described above, will be described.

The second reflector 2120 may reflect the light generated from the second light source 2110 toward the lens unit 3000 disposed in front of the second optical unit 2000. The second optical unit 2000 may spread the light more (e.g., wider) than the first optical unit 1000 so that drivers of nearby vehicles or pedestrians can more easily recognize the conveyed signals. Therefore, in the embodiment of the present disclosure, an example where the second reflector 2120 has a paraboloid shape to turn the light generated from the second light source 2110 into parallel light will be described. However, the present disclosure is not limited thereto, and the shape of the second reflector 2120 may be variously changed.

The lens unit 3000 may be disposed in front of the first optical unit 1000 and the second optical unit 2000 and may transmit the light generated from at least one of the first optical unit 1000 or the second optical unit 2000 to form a beam pattern suitable for the function of the vehicle lamp 1 of the present disclosure.

Here, the lens unit 3000 may include a plurality of lens modules 3100 and 3200 corresponding to the first optical unit 1000 and the second optical unit 2000, respectively. The lens modules 3100 and 3200 may be formed integrally to realize an integrated appearance so that the first optical unit 1000 and the second optical unit 2000 do not appear separate when the vehicle lamp 1 of the present disclosure is viewed from the exterior. The lens modules 3100 and 3200 may include a first lens module 3100 corresponding to the first optical unit 1000 and a second lens module 3200 corresponding to the second optical unit 2000.

Figure 11:
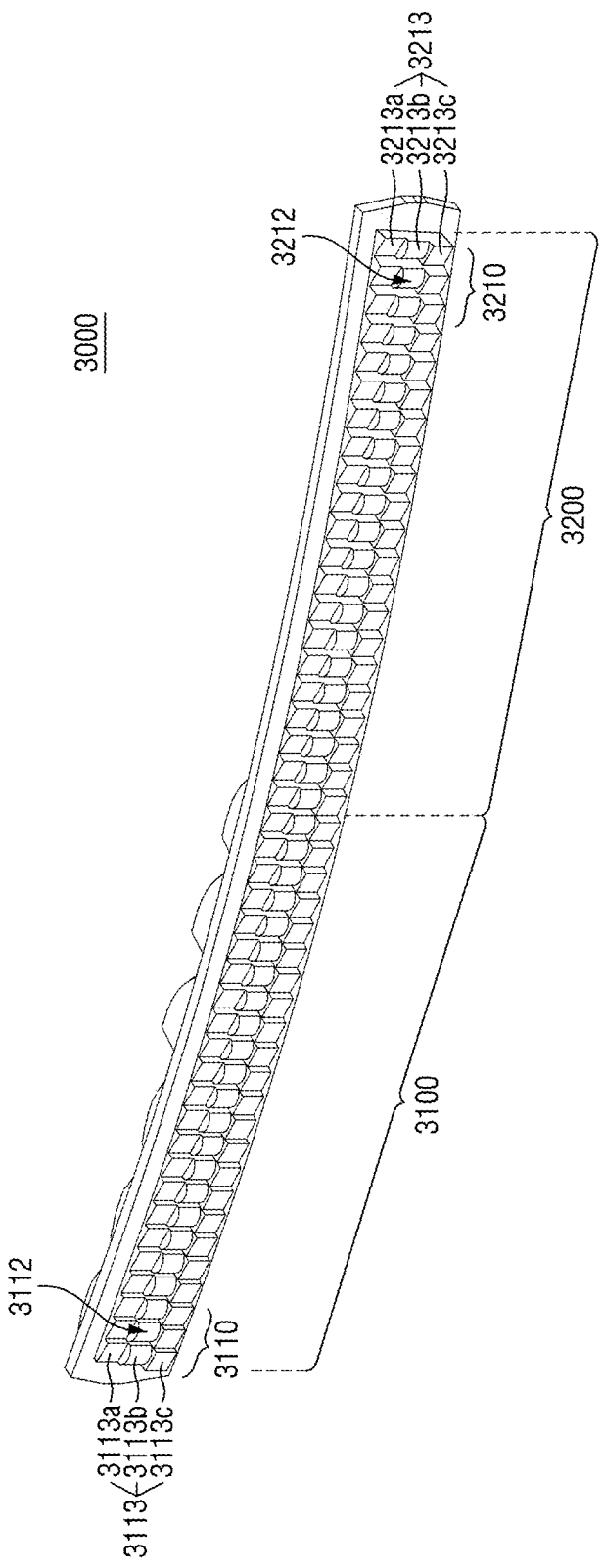
FIGS. 11 and 12 are perspective views of a lens unit according to an embodiment of the present disclosure.
Figure 12:
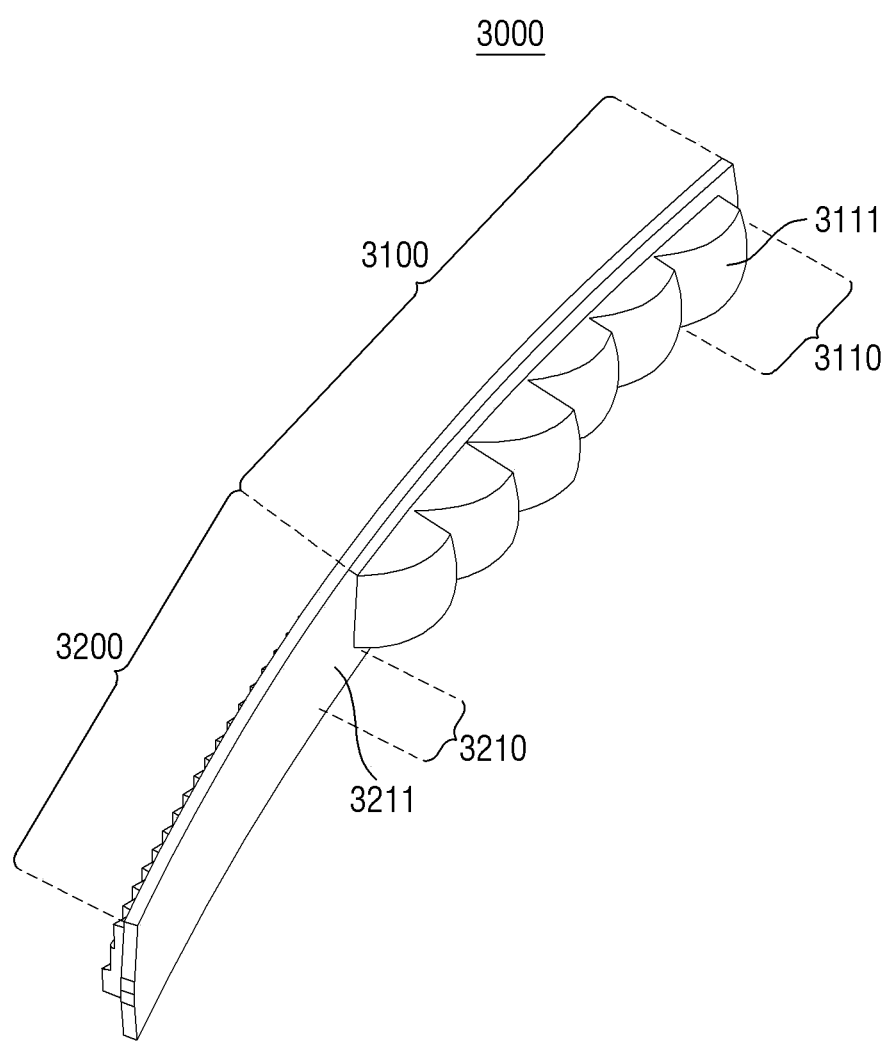
Figure 13:
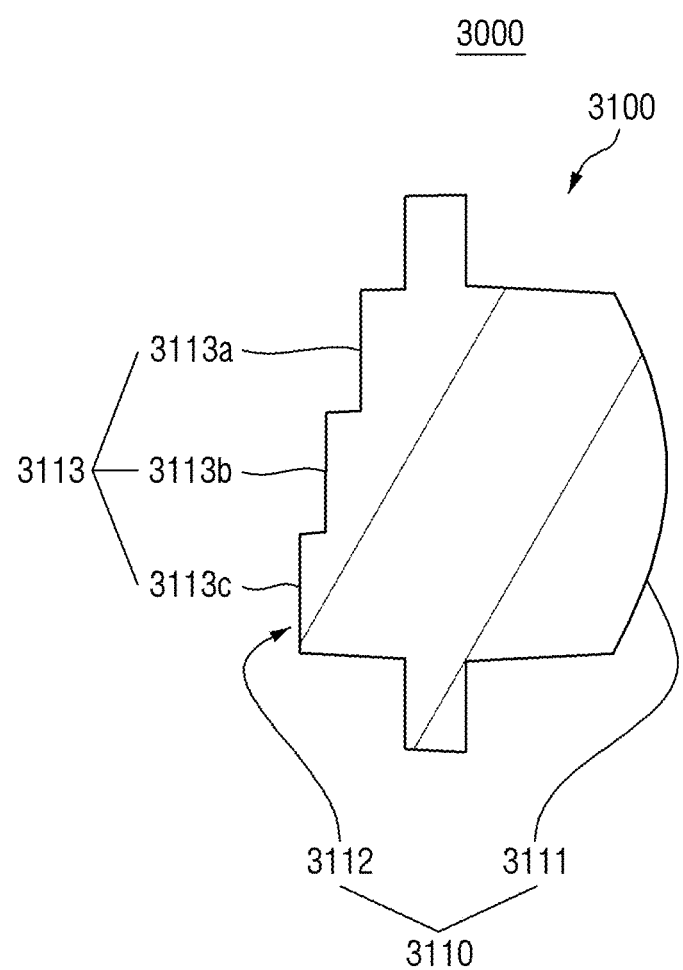
FIG. 13 is a cross-sectional view of a first optical module according to an embodiment of the present disclosure.
Figure 14:
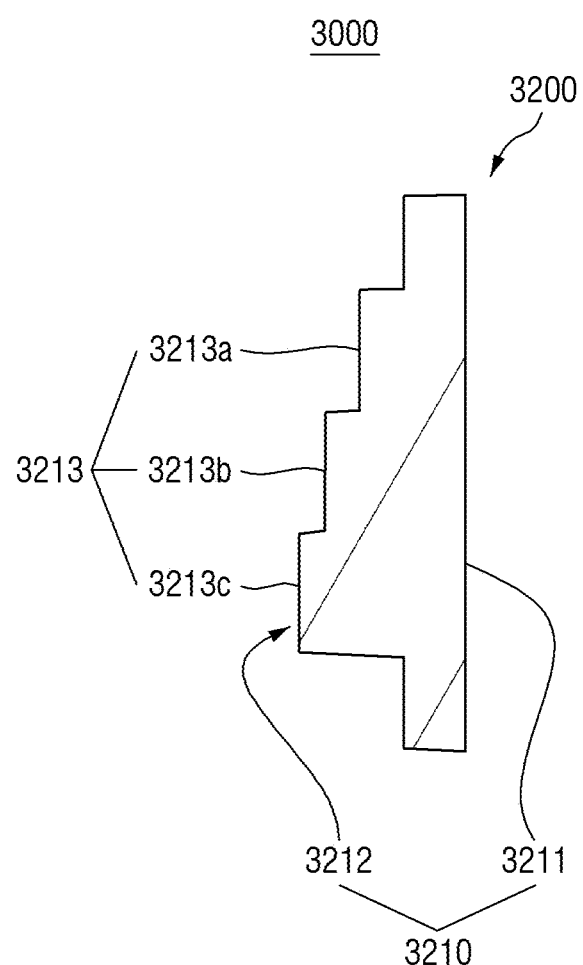
FIG. 14 is a cross-sectional view of a second optical module according to an embodiment of the present disclosure.

FIGS. 11 and 12 are perspective views of a lens unit 3000 according to an embodiment of the present disclosure. FIG. 13 is a cross-sectional view of a first optical module 3110 according to an embodiment of the present disclosure. FIG. 14 is a cross-sectional view of a second optical module 3210 according to an embodiment of the present disclosure.

Referring to FIGS. 11 through 14, the first lens module 3100 according to the embodiment of the present disclosure may include a plurality of first optical modules 3110, each corresponding to each of the plurality of first lamp modules 1100, and the first optical modules 3110 may be disposed in the left-right direction.

Each of the first optical modules 3110 may include a first incident portion 3111 and a first exit portion 3112. The first incident portion 3111 may be convex rearward toward a corresponding one of the first lamp modules 1100. The first exit portion 3112 may include a plurality of exit modules 3113 disposed in the left-right direction, and each of the exit modules 3113 may include a plurality of exit surfaces 3113a-3113c disposed in the up-down direction.

Each of the exit surfaces 3113a-3113c may be a flat surface, a curved surface, or a combination thereof. The exit surfaces 3113a-3113c may be disposed in a stepped shape such that they are disposed at more forward positions going from top to bottom. This configuration may prevent the light emitted from each of the exit surfaces 3113a-3113c from causing glare by proceeding to an adjacent upper exit surface.

In addition, the exit modules 3113 may be disposed in a stepped shape such that one side in the left-right direction is disposed more forward or rearward than the other side along the body line of the vehicle, like the first lamp modules 1100 and the second lamp modules 2100 described above.

In the embodiment of the present disclosure, the first incident portion 3111 may be convex rearward so that the first lens module 3100 and the second lens module 3200 have an integrated appearance.

The second lens module 3200 may include a plurality of second optical modules 3210, each corresponding to each of the plurality of second lamp modules 2100, and each of the second optical modules 3210 may include a second incident portion 3211 and a second exit portion 3212.

Here, the second incident portion 3211 may have a flat surface, a curved surface, or a combination thereof. The respective second incident portions 3211 of the second optical modules 3210 may form a continuous surface as a whole. This configuration may allow the light of the second optical unit 2000 to spread more than the light of the first optical unit 1000.

In other words, since the first incident portion 3111 may be convex rearward to concentrate the light of the first lamp module 1100, the front end of the shield 1130 formed along a rear focal plane of the first incident portion 3111 may extend rearward from the middle toward both sides. On the other hand, the second incident portion 3211 may have a flat shape to better spread the light.

Here, when the respective second incident portions 3211 of the second optical modules 3210 form a continuous surface as a whole, it may be understood that all of the second incident portions 3211 of the second optical modules 3210 collectively form a single, continuous, and differentiable flat surface, curved surface, or a combination thereof, as a whole.

The second exit portion 3212 may include a plurality of exit modules 3213 disposed in the left-right direction, like the first exit portion 3112 described above. Each of the exit modules 3213 may include a plurality of exit surfaces 3213a-3213c disposed in the up-down direction. The exit surfaces 3213a-3213c may be disposed in a stepped shape such that they are disposed at more forward positions going from top to bottom.

As described above, the first lens module 3100 corresponding to the first optical unit 1000 and the second lens module 3200 corresponding to the second optical unit 2000 may be integrally formed, and the exit surfaces 3113a-3113c of the first exit portion 3112 and the exit surfaces 3213a-3213c of the second exit portion 3212 may be formed to have a substantially uniform shape. Therefore, the lens unit 3000 as a whole may exhibit an integrated and substantially uniform appearance.

In the embodiment of the present disclosure, an example where the exit surfaces 3113a-3113c of the first exit portion 3112 and the exit surfaces 3213a-3213c of the second exit portion 3212 have the uniform shape to realize an integrated appearance is described. However, the present disclosure is not limited thereto, and in some embodiments, the exit surfaces 3113a-3113c of the first exit portion 3112 and the exit surfaces 3213a-3213c of the second exit portion 3212 may have different shapes depending on the light distribution characteristics of the first and second beam patterns, that is, the size, position, shape, and brightness of an area to which the light is irradiated.

Figure 15:
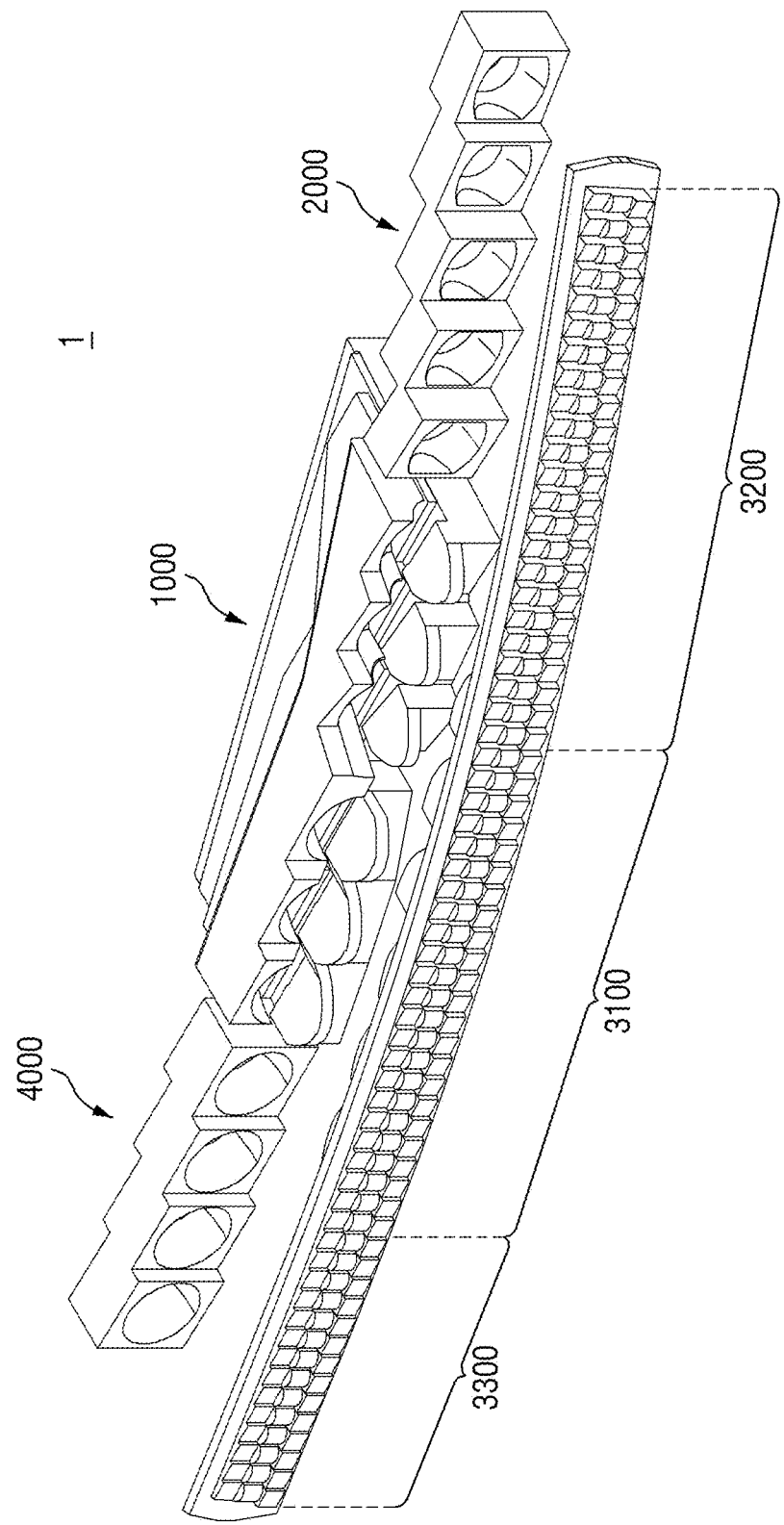
FIG. 15 is a perspective view of a vehicle lamp according to another embodiment of the present disclosure.
Figure 16:
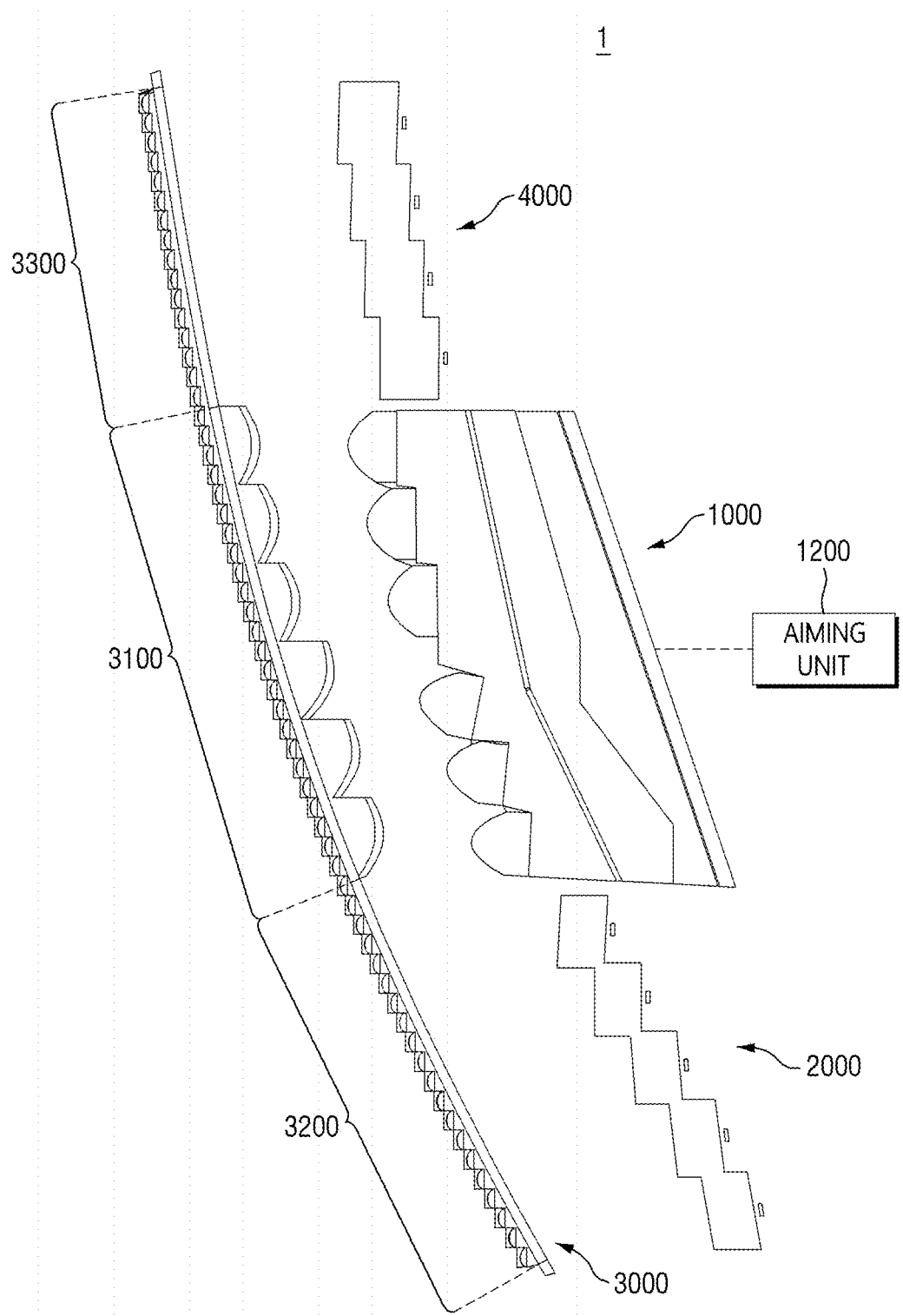
FIG. 16 is a plan view of the vehicle lamp according to the embodiment of FIG. 15.

FIG. 15 is a perspective view of a vehicle lamp 1 according to a related embodiment of the present disclosure. FIG. 16 is a plan view of the vehicle lamp 1 according to the embodiment of the present disclosure.

Referring to FIGS. 15 and 16, the vehicle lamp 1 according to the embodiment of the present disclosure may include a first optical unit 1000, a second optical unit 2000 disposed on any one side of the first optical unit 1000 in the left-right direction, and a third optical unit 4000 disposed on the other side of the first optical unit 1000 in the left-right direction. A lens unit 3000 may include a first lens module 3100 corresponding to the first optical unit 1000, a second lens module 3200 corresponding to the second optical unit 2000, and a third lens module 3300 corresponding to the third optical unit 4000. The first to third lens modules 3100, 3200 and 3300 may be integrally formed.

In other words, this embodiment of the present disclosure is an example where the third optical unit 4000 for irradiating light to form a third beam pattern is included in addition to the first optical unit 1000 and the second optical unit 2000 of the previous embodiment. In this embodiment of the present disclosure, the third optical unit 4000 may perform a signaling function, like the second optical unit 2000. Alternatively, when a low beam pattern is formed by the first optical unit 1000, the third optical unit 4000 may form a high beam pattern as the third beam pattern. As such, the third optical unit 4000 may be used as an illumination function together with the first optical unit 1000.

Here, when the third optical unit 4000 is used as the illumination function, it may include at least one lamp module having a similar structure to the first lamp modules 1100 of the first optical unit 1000 described above. When the third optical unit 4000 is used as the signaling function, it may include at least one lamp module having a similar structure to the second lamp modules 2100 of the second optical unit 2000 described above. However, the present disclosure is not limited thereto, and the structure of the lamp module included in the third optical unit 4000 may vary based on a beam pattern to be formed by the third optical unit 4000.

As described above, the vehicle lamp 1 of the present disclosure can realize an integrated and substantially unified appearance while being used as lamps for different purposes. Therefore, it is possible to prevent creating a sense of separation between lamps for different purposes.

In concluding the detailed description, those skilled in the art will appreciate that many variations and modifications can be made to the exemplary embodiments without substantially departing from the principles of the present disclosure. Therefore, the disclosed embodiments are used in a generic and descriptive sense only and not for purposes of limitation.

What is claimed is:

1. A vehicle lamp comprising:
a first optical unit that irradiates light for forming a first beam pattern;
a second optical unit that irradiates light for forming a second beam pattern, the second optical unit being disposed on one side of the first optical unit in a left-right direction; and
a lens unit disposed in front of the first optical unit and the second optical unit to allow the light irradiated from at least one of the first optical unit or the second optical unit to pass through the lens unit to form at least one of the first beam pattern or the second beam pattern,
wherein the lens unit comprises a first lens module corresponding to the first optical unit and a second lens module corresponding to the second optical unit, wherein the first lens module and the second lens module are integrally formed with one another,
wherein the first optical unit comprises a plurality of first lamp modules arranged in the left-right direction, and the second optical unit comprises a plurality of second lamp modules arranged in the left-right direction,
wherein the first lens module comprises a plurality of first optical modules corresponding to the plurality of first lamp modules,
wherein the second lens module comprises a plurality of second optical modules corresponding to the plurality of second lamp modules,
wherein each of the plurality of first optical modules comprises a first incident portion to which light is incident and a first exit portion from which the light incident to the first incident portion is output,
wherein each of the plurality of second optical modules comprises a second incident portion to which light is incident and a second exit portion from which the light incident to the second incident portion is output,
wherein the first incident portion and the second incident portion have different shapes, and/or the first exit portion and the second exit portion have different shapes, and
wherein each of the first exit portion and the second exit portion comprises a plurality of exit modules arranged in the left-right direction, and the plurality of exit modules are arranged in a stepped configuration such that the plurality of exit modules are disposed at more forward or rearward positions going from one side toward the other side in the left-right direction.

2. The vehicle lamp of claim 1, wherein the first optical unit and the second optical unit are spaced apart from each other by a predetermined distance.

3. The vehicle lamp of claim 1, wherein the second optical unit is disposed at laterally outer side from the first optical unit in a vehicle in the left-right direction.

4. The vehicle lamp of claim 1, wherein the first incident portion of each of the plurality of first optical modules is convex rearward, and the second incident portions of the plurality of second optical modules form a continuous surface.

5. The vehicle lamp of claim 1, wherein each of the plurality of exit modules comprises a plurality of exit surfaces arranged in an up-down direction, and the plurality of exit surfaces are arranged in a stepped configuration such that the plurality of exit surfaces in the each of the plurality of exit modules are disposed at more forward positions going from top to bottom.

6. The vehicle lamp of claim 1, wherein each of the first lamp modules comprises:
a first light source;
a first reflector that reflects the light generated from the first light source forward; and
a shield that obstructs at least a portion of the light that proceeds toward the lens unit after being reflected by the first reflector.

7. The vehicle lamp of claim 6, wherein a front end of the shield has a curved shape that extends rearward from a middle portion thereof toward both sides thereof.

8. The vehicle lamp of claim 1, wherein each of the second lamp modules comprises:
a second light source; and
a second reflector that reflects the light generated from the second light source forward.

9. The vehicle lamp of claim 1, further comprising:
an aiming unit that adjusts a direction in which the light is irradiated from the first optical unit by rotating the first optical unit in at least one of the up-down direction or the left-right direction.

10. The vehicle lamp of claim 1, further comprising:
a third optical unit disposed on the other side of the first optical unit in the left-right direction, such that one of the second optical unit or the third optical unit is disposed at laterally outer side of the first optical unit in the vehicle, and the other of the second optical unit or the third optical unit is disposed laterally inner side of the first optical unit in the vehicle.

11. The vehicle lamp of claim 10, wherein the lens unit further comprises a third lens module corresponding to the third optical unit, and the third lens module is integrally formed with the first lens module and the second lens module.

12. A vehicle lamp comprising:
a first optical unit that irradiates light for forming a first beam pattern;
a second optical unit that irradiates light for forming a second beam pattern, the second optical unit being disposed on one side of the first optical unit in a left-right direction; and
a lens unit disposed in front of the first optical unit and the second optical unit to allow the light irradiated from at least one of the first optical unit or the second optical unit to pass through the lens unit to form at least one of the first beam pattern or the second beam pattern,
wherein the lens unit comprises a first lens module corresponding to the first optical unit and a second lens module corresponding to the second optical unit, wherein the first lens module and the second lens module are integrally formed with one another,
wherein the first optical unit comprises a plurality of first lamp modules arranged in the left-right direction, and the second optical unit comprises a plurality of second lamp modules arranged in the left-right direction,
wherein the first lens module comprises a plurality of first optical modules corresponding to the plurality of first lamp modules,
wherein the second lens module comprises a plurality of second optical modules corresponding to the plurality of second lamp modules,
wherein each of the plurality of first optical modules comprises a first incident portion to which light is incident and a first exit portion from which the light incident to the first incident portion is output,
wherein each of the plurality of second optical modules comprises a second incident portion to which light is incident and a second exit portion from which the light incident to the second incident portion is output,
wherein the first incident portion and the second incident portion have different shapes, and/or the first exit portion and the second exit portion have different shapes, and
wherein the first incident portion of each of the plurality of first optical modules is convex rearward, and the second incident portions of the plurality of second optical modules form a continuous surface as a whole such that all of the second incident portions of the plurality of second optical modules collectively form a single, continuous, and differentiable surface that is a flat surface, a curved surface, or a combination thereof, as a whole.

13. The vehicle lamp of claim 12, wherein the first optical unit and the second optical unit are spaced apart from each other by a predetermined distance.

14. The vehicle lamp of claim 12, wherein the second optical unit is disposed at laterally outer side from the first optical unit in a vehicle in the left-right direction.

15. The vehicle lamp of claim 12, wherein each of the first lamp modules comprises:
a first light source;
a first reflector that reflects the light generated from the first light source forward; and
a shield that obstructs at least a portion of the light that proceeds toward the lens unit after being reflected by the first reflector.

16. The vehicle lamp of claim 15, wherein a front end of the shield has a curved shape that extends rearward from a middle portion thereof toward both sides thereof.

17. The vehicle lamp of claim 12, wherein each of the second lamp modules comprises:
a second light source; and
a second reflector that reflects the light generated from the second light source forward.

18. The vehicle lamp of claim 12, further comprising:
an aiming unit that adjusts a direction in which the light is irradiated from the first optical unit by rotating the first optical unit in at least one of the up-down direction or the left-right direction.

19. The vehicle lamp of claim 12, further comprising:
a third optical unit disposed on the other side of the first optical unit in the left-right direction, such that one of the second optical unit or the third optical unit is disposed at laterally outer side of the first optical unit in the vehicle, and the other of the second optical unit or the third optical unit is disposed laterally inner side of the first optical unit in the vehicle.

20. The vehicle lamp of claim 19, wherein the lens unit further comprises a third lens module corresponding to the third optical unit, and the third lens module is integrally formed with the first lens module and the second lens module.

* * * * *